Nov. 26, 1957 D. B. THOMAS 2,814,714
SHEET MATERIAL SPOT WELDING ATTACHMENT
Filed June 11, 1956 2 Sheets-Sheet 1
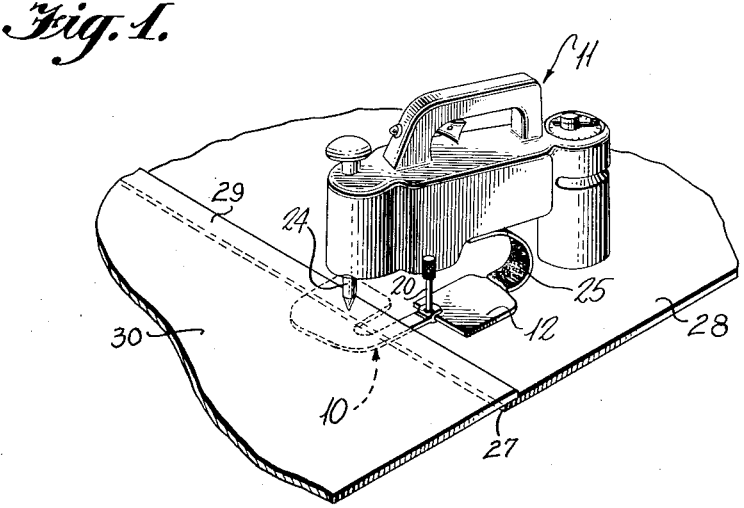
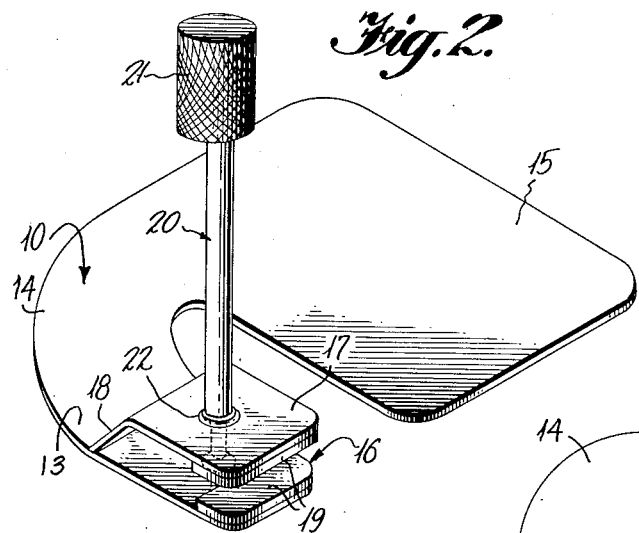
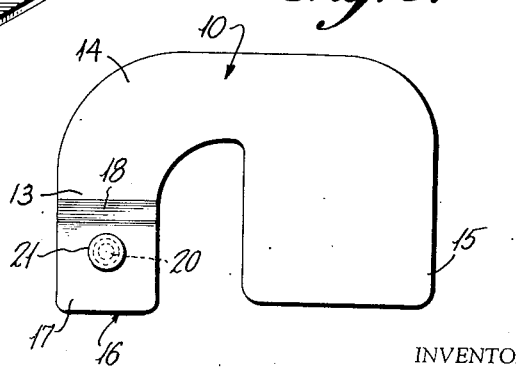
INVENTOR
Dorsey B. Thomas
BY Mason, Fenwick & Lawrence
ATTORNEYS

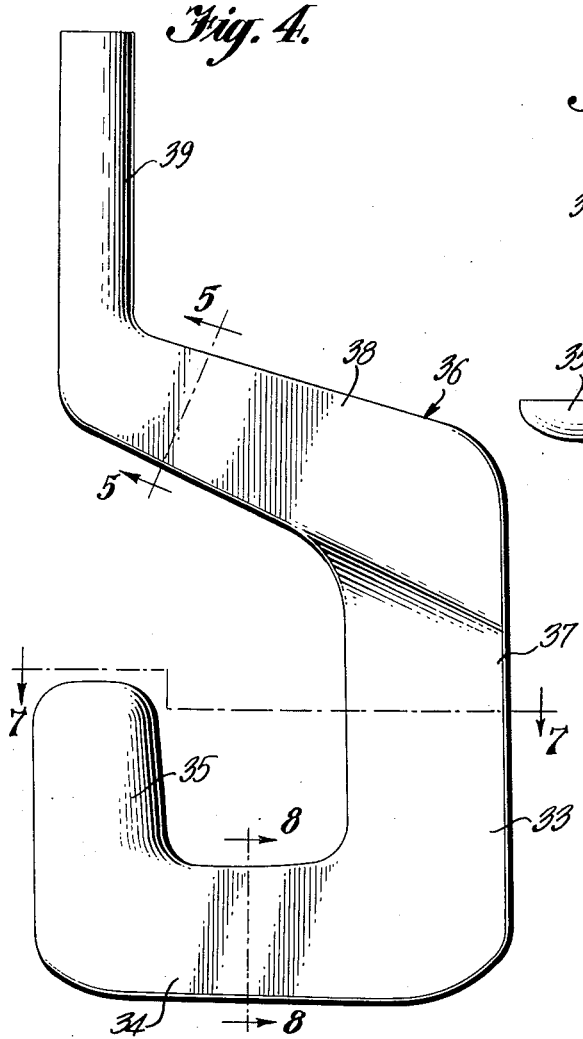
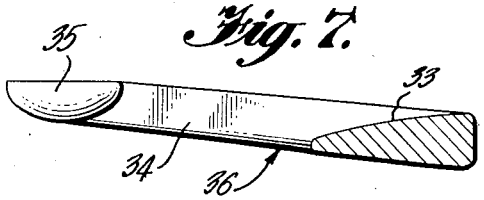
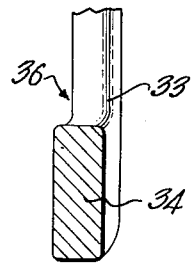
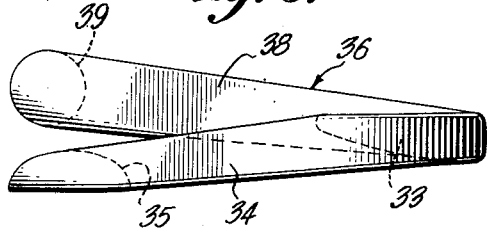

United States Patent Office 2,814,714
Patented Nov. 26, 1957

2,814,714

SHEET MATERIAL SPOT WELDING ATTACHMENT

Dorsey B. Thomas, Savannah, Ga.; Floye S. Thomas, heir and guardian of minor children of said Dorsey B. Thomas, deceased, assignor, by direct and mesne assignments, of one-half to D. B. Middleton and one-half to herself Application June 11, 1956, Serial No. 590,549

3 Claims. (Cl. 219—86)

The present invention relates in general to accessories for spot welding apparatus, and more particularly to anode attachments for portable manual electric spot welders to facilitate spot welding lap joints of sheet material of unlimited lengths and widths.

Heretofore, the dimensions of sheet metal, screen wire or like sheet material which may be effectively spot welded together along lapped edges of the material by existing portable spot welding apparatus have been severely limited. Either the dimensions of one of the sheet members perpendicular to the lap joint edge or that parallel to the lap joint edge must be less than the length of the spot welder electrodes projecting from the welder housing, since the projecting welding electrodes must accommodate the work material between them in order to permit the electrode points to engage the opposite surfaces of the lapped material and form the weld. As the length of conventional portable spot welder electrodes does not usually exceed six to eight inches, this dimension forms a practical limitation on either the length of the lap joint or the length of sheet material perpendicular to the lap joint axis that can be spot welded with such portable apparatus.

Lengthening of the welding electrodes of portable electrical resistance spot welders is not a satisfactory practical solution to this problem, as it is very important to keep the secondary circuit as short as possible to minimize impedance of the welding circuit and keep the power and weight requirements of the transformers down to within reasonable limits for portability. If transformer power and weight characteristics are kept to within normal limits and the length of the welding electrodes were increased to handle the usual ranges of sheet material stock width, the cross-sectional size of the secondary circuit conductor necessary to conduct a reasonable welding current with conventional circuit resistance characteristics would have to be increased to a completely impractical extent.

An object of the present invention, therefore, is the provision of a novel attachment for portable electric spot welders for facilitating convenient spot welding of lap joints for sheet material, wire screen and the like of unlimited length and width.

Another object of the present invention is the provision of a novel attachment for portable electric spot welders enabling spot welding of sheet material lap joints of unlimited lengths in forming the longitudinal seams of ducts, tubular or endless screen formations and the like, without appreciable elongation of the welding electrodes.

Another object of the present invention is the provision of a novel anode attachment for portable electric spot welders permitting disposition of a spot welder immediately adjacent lapped portions of sheet members intermediate the ends of the lapped portions and overlying one of the sheet members and insertion of a welding anode portion of the welder between the lapped portions into underlying relation with the lapped portions to facilitate spot welding of lap joints of unlimited length upon movement of the spot welder alongside the lap joint.

Other objects, advantages and capabilities of the present invention will become apparent from the following detail description, taken in conjunction with the accompanying drawing illustrating two preferred forms of the invention.

In the drawings:

Figure 1 is a perspective view of a portable spot welder having a lap joint welding attachment embodying the present invention associated therewith, illustrated in process of use to form a lap joint;

Figure 2 is a perspective view of the lap joint welding attachment;

Figure 3 is a top plan view of the attachment;

Figure 4 is a top plan view of a modified form of lap joint welding attachment adapted for insertion in the lower electrode mounting clamp of a conventional commercial spot welder;

Figure 5 is a section view taken along the line 5—5 of Figure 4;

Figure 6 is an end elevation view of the lower end of Figure 4;

Figure 7 is a section view taken along the line 7—7 of Figure 4; and,

Figure 8 is a section view taken along the line 8—8 of Figure 4.

Referring to the drawings, wherein like reference characters designate corresponding parts throughout the several figures, the present invention comprises a recurved lap joint welding anode member 10 which is adapted to be associated with suitable commercially available portable spot welders such as the spot welder 11 of the type illustrated in my Design Patent No. 177,653, issued May 8, 1956, by attachment to the flat anode plate 12 forming one of the welding electrodes of the spot welder 11 or by substituting the anode member 10 for the lowermost welding electrode of portable spot welders of the type disclosed in U. S. Patent No. 2,441,438, issued May 11, 1948, to A. C. Mulder. The lap joint welding anode member 10 illustrated in Figures 1 through 3 is a distorted U-shaped plate of sheet metal comprising a shank portion 13 forming one leg of the U, a curved neck portion 14 extending therefrom along approximately a 90° arc and forming a portion of the bight of the U, and a bearing plate portion 15 which is offset laterally from the shank portion 13 and projects parallel to the shank 13 from the neck portion 14 to form the other leg of the U. The plate portion 15 is designed to form a bearing shoe for the lowermost sheet member of a lap seam and is generally rectangular in outline to afford a substantial upwardly facing bearing surface for supporting a lap seam. A clamp 16 is formed on the end of the shank portion 13. It comprises a plate 17 conforming to the outline of the end portion of the shank 13 which is located in overlying relation to the shank 13 and secured thereto by an angular extension 18 which is welded to the shank 13 remote from the shank end. Both the anode member 10 and the clamp plate 17 are of resiliently deformable sheet material. Accordingly, the jaws of the clamp 16 may be flexed toward and away from each other about the weld joint between the extension 18 and shank 13. Suitable jaw pads 19 are affixed to the facing end portion of the clamp plate 17 and shank 13, and a clamp rod 20 having a knurled head 21 and a bearing collar 22 is threaded to a screw 23 extending through aligned apertures in the plate 17 and shank 18. The collar 22 and the head of the screw 23 bear upon the opposite surfaces of the plate 17 and shank 13 to urge these members and the jaw pads 19 together.

In the use of the attachment 10, it is mounted on the spot welder 11 by fitting the clamp formation 16 over the outer edges of the anode plate 12 to embrace the anode plate 12 between the jaw pads 19, and the clamp rod 20 is rotated the draw the collar 22 and the head of the screw 23 toward each other until the jaw pads firmly clamp the anode plate 12. The anode plate 12 which forms one of the welding electrodes of the spot welder 11, the upper welding electrode being indicated at 24, is supported from the spot welder transformer core in electrical communication with the secondary winding by a heavy wire mesh strap 25 which may be deformed to position the anode plate 12 in various positions relative to the upper electrode 24. When the lap joint attachment 10 has been clamped onto the spot welder anode plate 12, the strap 25 is deformed to position the bearing shoe forming plate 15 immediately beneath and substantially perpendicular to the axis of the upper electrode 24 and in parallelism with the longitudinal axis of the welder 11. The leading edge 26 of the attachment then lies transversely of the welder 11 and the shank portion 13 extends back toward the longitudinal axis of the welder 11 along a laterally displaced axis. The welder 11 is then manipulated relative to the lap seam edge 27 of the lowermost sheet or screen member 28 to hook the bearing shoe forming plate portion 15 under the edge 27 with the plane of the plate portion 15 in substantial parallelism with the plane of the sheet member 28, and the lap edge 29 of the uppermost sheet or screen member 30 is disposed over the lower lap edge 29 and below the tip of the upper electrode 24 to position the lap joint portions between the electrode 24 and attachment 10 to be engaged by them and complete the welding current circuit. Alternatively, the edges 29 and 21 of the sheets 28, 30 may be lapped over each other and the leading edge 26 of the attachment inserted between them a sufficient distance to project the free edge of the bearing shoe plate 15 beyond the lower lap edge 27 and then returned to lap the plate 15 under the edge 27 to position the welder 11 and attachment 10 for use. The welder in this condition extends over the lower sheet or screen member 28 along an axis lying perpendicular to the axis of the lap joint. The welder 11 is then shifted laterally to position the upper electrode 24 to overlie the lapped edges 27, 29 adjacent one end of the lap seam and spot weld that end. The unit may then be conveniently displaced laterally to successive spot welding locations along the entire length of the seam. Because of this construction the unit can spot weld a lap seam joining a pair of sheets or screens or joining the opposite edges of a single sheet or screen with equal facility. It is particularly advantageous to use in the latter application, such as in forming the longitudinal lap seams or the transverse connecting joints of sheet metal ducting or of screen or metal wire cloth such as the face wires on cylindrical type filters, due to the ease with which the anode 15 can be positioned to underlie the lap seam without having to project it around a lateral edge of the sheet material.

Figures 4 to 8, inclusive, illustrate a modified form of the lap joint anode attachment adapted for use with conventional spot welders of the type illustrated in the Mulder Patent No. 2,441,438. This type of spot welder employs a lower L-shaped electrode clamped at its rear end in a circular cross-section socket to project in parallelism with the longitudinal axis of the spot welder and an upper L-shaped electrode which is pivoted at its rear end for vertical movement relative to the lower electrode. This modified form of lap joint anode attachment is indicated generally by the reference character 31 and comprises an outer or leading U-shaped portion formed by a leg 33 forming the bearing shoe, a bridge portion 34, and a leg portion 35 corresponding generally to the shank 13, neck 14 and bearing shoe plate 15 of the attachment 10. As the clamping socket for the lowermost electrode in the Mulder type of spot welder is vertically aligned with the upper electrode, an integral Z-shaped offset 36 extends from the leg 33 to dispose the bearing shoe forming leg 35 in alignment with the upper electrode, and comprises a leg portion 37 joined to and axially aligned with the leg 33, an offset bridge portion 38, and a mounting leg 39 parallel to the leg 37 and axially aligned with the bearing shoe forming leg 35. The mounting leg 39 is of circular cross-section to adapt it to be accommodated in the lower electrode clamping socket of the Mulder-type spot welder. The offset bridge portion 38 is inclined slightly from the leg 37 to the leg 39 relative to the plane of the bridge portion 34 to dispose the bearing shoe forming leg 35 below the axis of the mounting leg 39 and adapt the shoe 35 to be lapped under the lower lap seam edge 27 in a manner which will permit normal positioning of the spot welder over the sheet material.

The modified form of lap joint welding attachment 31, when thus assembled with a Mulder-type spot welder, is manipulated in the same manner as the embodiment of Figures 1–3 to position the lapped edges 27, 29 of the sheet members between the bearing shoe leg 35 and the upper electrode in condition to form spaced welds along the seam when the sheet material is contacted by the electrode and attachment 31 and completes the secondary welding circuit through them.

While only two preferred embodiments of the invention have been particularly shown and described, it is apparent that other various modifications may be made in the invention without departing from the spirit and scope thereof, and it is desired, therefore, that only such limitations shall be placed thereon as are imposed by the prior art and are set forth in the appended claims.

I claim:

1. An attachment for spot welding lap joint seams of sheet material and the like adapted for use with a portable electric spot welder of the type having a transformer core, a secondary winding supported rigidly on said core having an exposed secondary winding extension projecting exteriorly of said welder, and a welding electrode in electrical communication with said secondary winding, comprising a detachable anode member of resiliently deformable, electrically conductive sheet material of generally U-shaped outline including a mounting leg portion forming one of the legs of the U having clamping means on the free end thereof for removable attachment of the anode member to said exposed secondary winding extension in laterally offset, outwardly projecting, parallel relation to the longitudinal axis of the spot welder, a neck portion curving from said mounting leg portion remote from said clamping means to project transversely from the mounting leg portion, and a generally rectangular bearing plate portion forming the other leg of the U to project toward the spot welder from said neck portion and underlie said welding electrode, the edge of said neck and bearing plate portions of said anode member remote from said clamping means forming a leading edge lying substantially transversely of the longitudinal axis of the welder for insertion between the lapped edges of sheet members arranged to form a lap joint and displacement transversely of said lapped edges to dispose said bearing plate portion in underlying relation to said lap sheet member edges relative to said electrode with said mounting leg extending between said edges transversely thereof in laterally spaced leading relation to said bearing plate portion relative to a direction of travel of said anode member along said lapped edges.

2. An attachment for spot welding lap joint seams of sheet material and the like adapted for use with a portable electric spot welder of the type having a transformer core, a secondary winding supported rigidly on said core having an exposed secondary winding extension projecting exteriorly of said welder, and a welding electrode in electrical communication with said secondary winding, comprising a detachable anode member of resiliently deformable, electrically conductive sheet material of generally U-shaped outline including a mounting leg portion forming one of the legs of the U having clamping means on the free end thereof for removable attachment of the anode member to said exposed secondary winding extension in laterally offset, outwardly projecting, parallel relation to the longitudinal axis of the spot welder, a neck portion curving from said mounting leg portion remote from said clamping means to project transversely from the mounting leg portion, and a generally rectangular bearing plate portion forming the other leg of the U to project toward the spot welder from said neck portion and underlie said welding electrode, the edge of said neck and bearing plate portions of said anode member remote from said clamping means forming a leading edge lying substantially transversely of the longitudinal axis of the welder for insertion between the lapped edges of sheet members arranged to form a lap joint to project said bearing plate portion beyond the lowermost lapped edge and return the same in an opposite direction to lap said bearing plate portion under said lowermost lapped edge in position to complete a spot welding current path through said electrode and lapped portions of said sheet members.

3. An attachment for spot welding lap joint seams of sheet material and the like adapted for use with a portable electric spot welder of the type having a transformer core, a secondary winding supported rigidly on said core having an exposed secondary winding extension formed of readily deformable electrically conductive material projecting exteriorly of said welder and terminating in a lower welding electrode plate, and an upper welding electrode in electrical communication with said secondary winding, comprising a detachable anode member of resiliently deformable, electrically conductive sheet material of generally U-shaped outline including a mounting leg portion forming one of the legs of the U terminating in a pair of vertically spaced, coextensive jaw-forming clamping plates joined together remote from the end of said mounting leg portion having threaded means for adjusting the spacing between said clamping jaw plates for clamping an edge of said electrode plate between said clamping plates to removably attach the anode member to said electrode plate in laterally offset, outwardly projecting, parallel relation to the longitudinal axis of the spot welder, a neck portion curving from said mounting leg portion remote from said clamping plates to a position projected transversely from the mounting leg portion, and a general rectangular bearing plate portion forming the other leg of the U projected toward the spot welder from said neck portion to a position underlying said upper welding electrode, the edge of said neck and bearing plate portions of said anode member remote from said clamping plates forming a leading edge lying substantially transversely of the longitudinal axis of the welder for insertion between the lapped edges of sheet members arranged to form a lap joint to project said bearing plate portion beyond the lowermost lapped edge and return the same in an opposite direction to lap said bearing plate portion under said lowermost lapped edge in position to complete a spot welding current path through said upper electrode and the lapped portions of said sheet members.

References Cited in the file of this patent

UNITED STATES PATENTS 2,677,744     Fahrenbach _____ May 4, 1954

FOREIGN PATENTS 730,097     Germany _____ Jan. 7, 1943